(12) United States Patent
Wang

(10) Patent No.: US 10,565,763 B2
(45) Date of Patent: Feb. 18, 2020

(54) METHOD AND CAMERA DEVICE FOR PROCESSING IMAGE

(71) Applicant: Beijing Xiaomi Mobile Software Co., Ltd., Beijing (CN)

(72) Inventor: Qian Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 80 days.

(21) Appl. No.: 15/941,132

(22) Filed: Mar. 30, 2018

(65) Prior Publication Data

US 2018/0286097 A1 Oct. 4, 2018

(30) Foreign Application Priority Data

Apr. 1, 2017 (CN) .......................... 2017 1 0214509

(51) Int. Cl.
  *G06T 11/60* (2006.01)
  *G06K 9/00* (2006.01)
  *G06K 9/20* (2006.01)
  *H04N 5/232* (2006.01)

(52) U.S. Cl.
  CPC .......... *G06T 11/60* (2013.01); *G06K 9/00221* (2013.01); *G06K 9/00288* (2013.01); *G06K 9/00302* (2013.01); *G06K 9/2081* (2013.01); *H04N 5/23219* (2013.01); *H04N 5/23216* (2013.01); *H04N 5/23293* (2013.01)

(58) Field of Classification Search
  CPC ................ G06T 11/60; G06K 9/00221; G06K 9/00288; G06K 9/00302; G06K 9/2081; H04N 5/23219
  See application file for complete search history.

(56) References Cited

U.S. PATENT DOCUMENTS

| 2008/0013800 | A1 | 1/2008 | Steinberg | |
|---|---|---|---|---|
| 2010/0026831 | A1 | 2/2010 | Ciuc | |
| 2011/0311150 | A1 | 12/2011 | Okamoto | |
| 2013/0201344 | A1* | 8/2013 | Sweet, III | G06K 9/00261 348/169 |
| 2014/0176764 | A1* | 6/2014 | Nakamura | G06K 9/00308 348/231.99 |
| 2017/0262970 | A1* | 9/2017 | Chen | G06K 9/00268 |

FOREIGN PATENT DOCUMENTS

| CN | 103413270 A | 11/2013 |
|---|---|---|
| CN | 103888658 A | 6/2014 |
| CN | 104184942 A | 12/2014 |
| CN | 104318262 A | 1/2015 |
| CN | 104574299 A | 4/2015 |

(Continued)

OTHER PUBLICATIONS

European Search Report mailed in corresponding EP Patent Application No. 18164897.3, dated Jun. 26, 2018, 8 pages.

(Continued)

*Primary Examiner* — David F Dunphy

(74) *Attorney, Agent, or Firm* — Arch & Lake LLP

(57) ABSTRACT

Methods of processing an image and terminals are provided. In one aspect, the number of persons in an image to be processed is determined, image processing is performed on a user image to be processed in the image when the number of the persons is greater than or equal to a threshold.

15 Claims, 7 Drawing Sheets

Smart Phone

(56) References Cited

FOREIGN PATENT DOCUMENTS

| CN | 105872252 A | 8/2016 |
|----|-------------|--------|
| CN | 105979141 A | 9/2016 |
| EP | 1990769 A1 | 11/2008 |
| JP | 2006072506 A | 3/2006 |
| JP | 2010263519 A | 11/2010 |

OTHER PUBLICATIONS

European Patent Office Office Action Issued in Application No. 18164897.3, dated Aug. 20, 2019, (5p).
First Office Action and Search Report Issued in Chinese Application No. 201710214509.X, dated Oct. 31, 2019, with English translation, (17p).

\* cited by examiner

Smart Phone

METHOD AND CAMERA DEVICE FOR PROCESSING IMAGE

CROSS REFERENCE TO RELATED APPLICATIONS

This application claims priority to Chinese Patent Application No. 201710214509.X entitled "METHOD, DEVICE AND TERMINAL FOR PROCESSING IMAGE" filed on Apr. 1, 2017, the entire content of which is incorporated herein by reference.

TECHNICAL FIELD

The present disclosure relates to terminal technical fields, and more particularly to processing an image by a camera device.

BACKGROUND

A beautifying function, as an image processing function, can include recognizing a local image (such as a face image, a leg image, a body image, and the like) in an image through an image recognition technology, and performing beautifying processing on the recognized local image. Based on the beautifying function, beautifying processing can be performed on a user image in the image, such as skin resurfacing and whitening, face thinning and eye enlarging, freckle and acne removing, tooth whitening, nose bridge heightening and makeup.

SUMMARY

According to examples of the present disclosure, methods of processing an image and terminals are provided to meet personalized image processing requirements of users.

In one aspect, a method of processing an image is provided, which includes: determining the number of persons in an image to be processed; and performing image processing on a user image to be processed in the image when the number of the persons is greater than or equal to a threshold.

In another aspect, a terminal is provided, which includes: a processor, and a non-transitory machine-readable storage medium storing machine executable instructions which cause the processor to: determine the number of persons in an image to be processed; and perform image processing on a user image to be processed in the image when the number of the persons is greater than or equal to a threshold.

In a third aspect, a camera device is provided. The camera device may include a touch screen for displaying images and receive user inputs; a processor in communication with the touch screen; and a non-transitory machine-readable storage medium storing machine executable instructions. When executed by the processor, the executable instructions cause the processor to: receive a user input on the touch screen identifying a plurality of persons in a picture frame while taking a group picture of the plurality of persons; determine a total number of persons in the group picture according to the user input; segment the group picture to a plurality of sub-images respectively corresponding to each person in the group picture; and perform image processing using pre-stored settings on respective sub-images in the group picture when the number of persons is greater than or equal to a threshold.

It should be understood that the above general descriptions and detailed descriptions below are only exemplary and explanatory and not intended to limit the present disclosure.

BRIEF DESCRIPTION OF DRAWINGS

The drawings herein, which are incorporated in and constitute part of this description, illustrate examples consistent with the present disclosure and serve to explain the principles of the present disclosure together with the description.

DETAILED DESCRIPTION

Figure 1A:
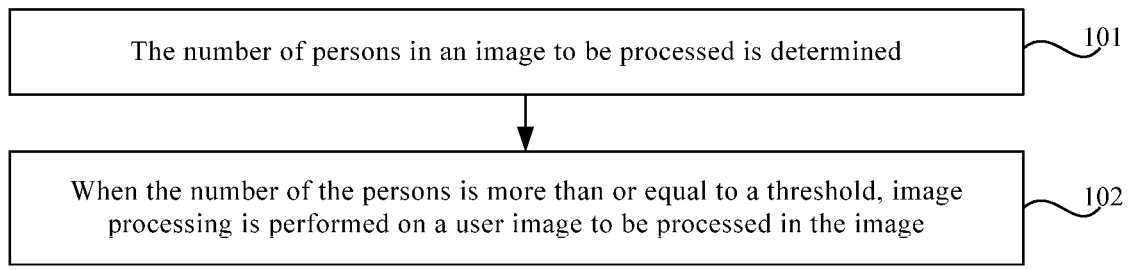
FIG. 1A is a flowchart illustrating a method of processing an image according to an example of the present disclosure.

Illustrative examples will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are examples of a device and a method consistent with some aspects of the present disclosure described in detail in the appended claims.

Figure 1B:
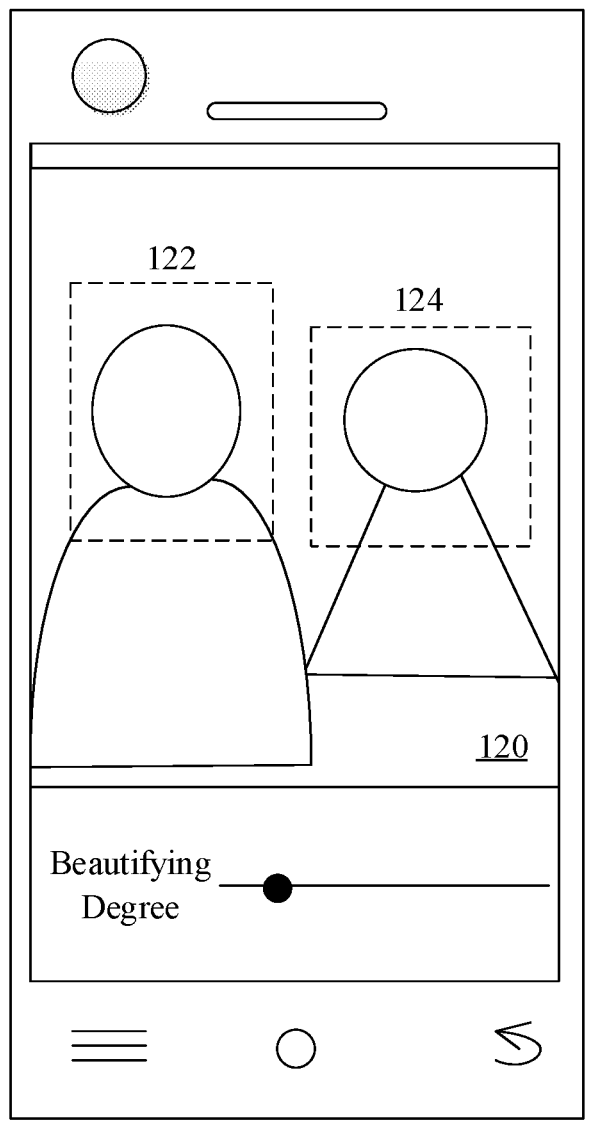
FIG. 1B is a schematic diagram illustrating a scenario for a method of processing an image according to an example of the present disclosure.

FIG. 1A is a flowchart illustrating a method of processing an image according to an example of the present disclosure. FIG. 1B is a schematic diagram illustrating a scenario for a method of processing an image according to an example of the present disclosure. The method for processing an image may be applied to a terminal. In an example, the terminal can be a smart terminal with a network access function, such as a mobile phone, a tablet, a Personal Digital Assistant (PDA), and the like. The terminal can access a router via a wireless local area network, and the terminal can access a server on a public network via the router. As shown in FIG. 1A, the method of processing an image includes procedures as follows.

At block 101, the number of persons in an image to be processed is determined.

The image to be processed may be an image selected from an album of a terminal by a user. The image to be processed may be an image taken through a camera by the user. When it is detected that an image is taken by the camera, the image may be determined to be an image to be processed, and a processing interface may be displayed. Different processing parameters may be displayed on the processing interface.

In an example, when the terminal determines that the image to be processed is a group image, each of user images in the group image may be recognized, and a selecting operation and a processing operation of the user on the image to be processed may be received.

At block 102, when the number of the persons is greater than or equal to a threshold, image processing is performed on a user image to be processed in the image.

In an example, the image processing is beautifying processing.

In an example, the user image is a user image selected in the group image by a user, or may be an image of an owner user recognized through an algorithm such as human face recognition, or may be a user image satisfying a preset user condition (e.g., there is a young female in the user image) which is recognized through algorithm, etc. The terminal may perform a first image processing on the owner image corresponding to a first setting for the owner. In addition, the terminal may perform a second image processing on other sub-images corresponding to a second setting for persons other than the owner.

Here, the terminal performs different beautifying processing corresponding to different levels on different user images in the group image. For example, no beautifying processing is performed on an image, and the beautifying processing is performed on another image. For another example, deep beautifying processing is performed on an image, and basic beautifying processing is performed on another image, etc. The beautifying processing may include face beautifying, background processing, expression replacing, posture replacing, and the like. In an example, the terminal can perform respective processing on different users in the group image, and a same processing parameter or different processing parameters can be used. Further, the processing may be performed on a face image of the user or on a body image of the user.

In an example, the threshold is set to be 2. In an exemplary scenario in FIG. 1B, there are two user images 122 and 124 in the group image 120, a smart phone is taken as a terminal, and an image to be processed is displayed on an image processing interface on the terminal. The terminal recognizes that the number of the persons in the image 120 to be processed is equal to 2, thus, determines that the image to be processed is a group image. When a selection operation of a user from the user images is detected, a user image corresponding to the selection operation is determined to be the user image to be processed, and the beautifying processing is performed on the selected user image.

The image processing process is described in detail in examples below.

According to the method above in an example of the present disclosure, the beautifying processing is performed on the user image to be processed in the group image, so as to meet personalized requirements of the user. Since different persons cannot have exactly same features about gender, skin color, five sense organs, age, fatness or thinness, etc., the different persons may desire different beautifying functions and respective parameters for the beautifying functions. For example, different face thinning degrees are desired for round faces and long faces, and different skin smoothing and whitening degrees are desired for black skins and white skins. When a uniform processing is performed on different user images in the group image by using a uniform processing parameter, processing effect cannot meet requirements of different users. The method according to examples of the present disclosure can solve the problem above, and processing effect on the group image can be harmonious and natural. Further, when users in the group image have a big age gap with each other, image distortion and image irregularity caused by performing processing with a uniform processing parameter can be avoided.

The technical solutions are described in detail below in examples of the present disclosure.

Figure 2:
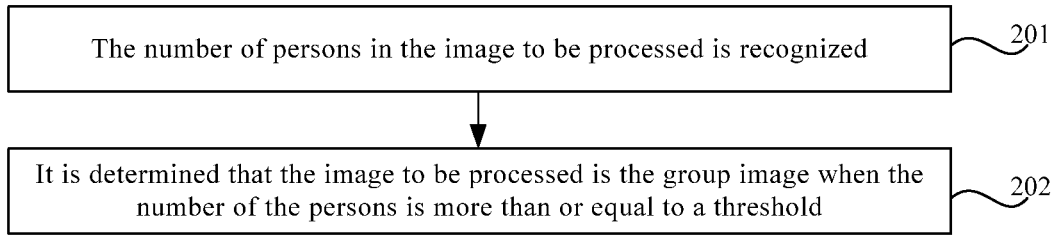
FIG. 2 is a flowchart illustrating a method of processing an image according to another example of the present disclosure.

FIG. 2 is a flowchart illustrating a method of processing an image according to another example of the present disclosure. According to the method in the example of the present disclosure, how to determine that an image to be processed is a group image is described in combination with FIG. 1B. As shown in FIG. 2, the method includes procedures as follows.

At block 201, the number of persons in the image to be processed is recognized.

In an example, the terminal uses technologies such as face recognition to determine the number of the persons in the image to be processed. The terminal may segment the image to a plurality of sub-images, where each sub-image includes a person. As illustrated in FIG. 1B, the terminal may segment the image 120 to a plurality of sub-images including sub-images 122 and 124. The sub-image 122 includes the first user face corresponding to the first person while the sub-image 124 includes the second user face corresponding to the second person.

At block 202, it is determined that the image to be processed is the group image when the number of the persons is greater than or equal to a threshold.

In an example, the threshold is set to be 2. When the terminal determines that there are a plurality of persons in the image, the terminal may segment the image to a plurality of sub-images respectively corresponding to the plurality of persons. The plurality of sub-images may have the same shape or different shapes depending on which body part of each person is in the image frame and the area of the body part. The user may also move or resize the frame of each sub-image to cover the desired area to be processed. Here, the first image processing may include beautifying processing for the owner image corresponding to the owner while the second image processing may be no processing for the other sub-images corresponding to other persons in the group picture.

In the example, in blocks 201-202 above, recognition technology is used to recognize the number of persons in the image to be processed, and the beautifying processing is performed on the user image to be processed in the group image when it is determined that the image to be processed is the group image.

Figure 3:
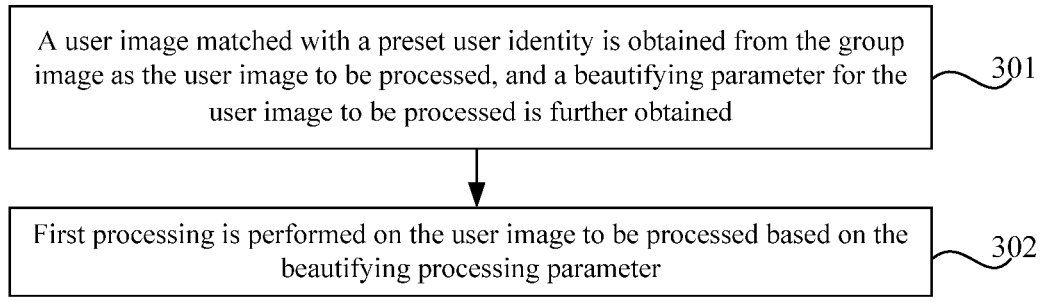
FIG. 3 is a flowchart illustrating a method of processing an image according to still another example of the present disclosure.

FIG. 3 is a flowchart illustrating a method of processing an image according to another example of the present disclosure. According to the method in the example of the present disclosure, how to perform beautifying processing on the user image to processed in the group image is described in combination with FIG. 1B. As shown in FIG. 3, the method includes procedures as follows.

At block 301, a user image matched with a preset user identity is obtained from the group image as the user image to be processed, and a beautifying parameter for the user image to be processed is further obtained.

In an example, the preset user identity includes a preset user image, for example, an owner image of an owner of the terminal. Deep beautifying processing may be performed on the owner user image. Light beautifying processing may be performed on another user image, or no beautifying processing may be performed on the another user image. In another example, the preset user identity includes a female age range, such as a female 20 to 30 years old. The terminal may estimate whether there is a female within the preset age range through recognition algorithm. Corresponding beautifying processing may be performed on the user image matched with the above identity feature. No beautifying processing is performed on the user image not matched with the identity feature.

At block 302, first processing is performed on the user image to be processed based on the beautifying processing parameter.

Figure 4:
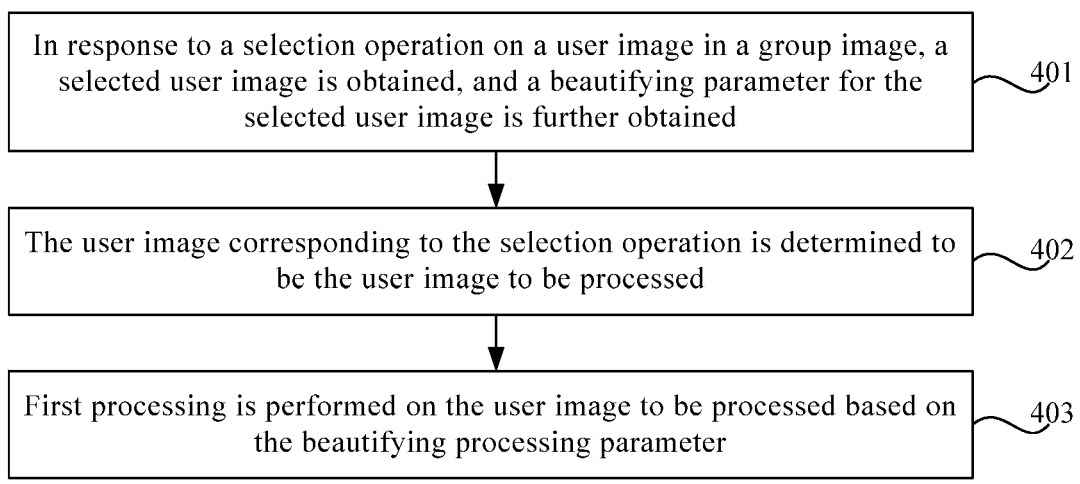
FIG. 4 is a flowchart illustrating a method of processing an image according to yet another example of the present disclosure.

FIG. 4 is a flowchart illustrating a method of processing an image according to another example of the present disclosure. According to the method in the example of the present disclosure, how to perform beautifying processing on a user image to be processed in a group image is described in combination with FIG. 1B. As shown in FIG. 4, the method includes procedures as follows.

At block 401, in response to a selection operation on a user image in a group image, a selected user image is obtained, and a beautifying parameter for the selected user image is further obtained.

In the example above, when the terminal performs human face recognition on the group image, a selection operation is performed by the user on the user image for which the beautifying processing is to be performed. For example, the user clicks on an identity box displayed corresponding to the user image to select a corresponding user.

In an example, the preset user image and a beautifying parameter corresponding to the preset user image are pre-stored. The beautifying parameter may be obtained based on previous beautifying processing, or may be manually set by a user and stored.

For example, on an interface of an image processing APP, the beautifying processing is performed for the user image based on the beautifying processing parameter selected by the user or based on the pre-stored beautifying processing parameter. Image processing options are provided on the APP interface. The user may select a beautifying processing parameter such as a beautifying processing parameter corresponding to "skin resurfacing and whitening" processing, a beautifying processing parameter corresponding to "freckle and acne removing" processing, a beautifying processing parameter corresponding to "face thinning and body thinning" processing. The terminal stores the beautifying processing parameter associated with a user image based on the beautifying processing parameter selected by the user. Each beautifying processing option may further include respective parameters corresponding to different levels. For example, there are five levels for the beautifying processing parameters corresponding to the "skin resurfacing and whitening" processing. Higher the level, higher the whitening degree. The terminal performs the beautifying processing on the selected user image based on the beautifying processing parameter selected by the user, thus, different beautifying processing degrees can be performed on different user images, users with different ages or different requirements can have different processing effects, the respective requirements for different users are satisfied, and harmonization degree for overall processing effect on the group image can be enhanced.

At block 402, the user image corresponding to the selection operation is determined to be the user image to be processed.

At block 403, first processing is performed on the user image to be processed based on the beautifying processing parameter.

The first processing performed on the user image to be processed is described in conjunction with examples below.

Figure 5:
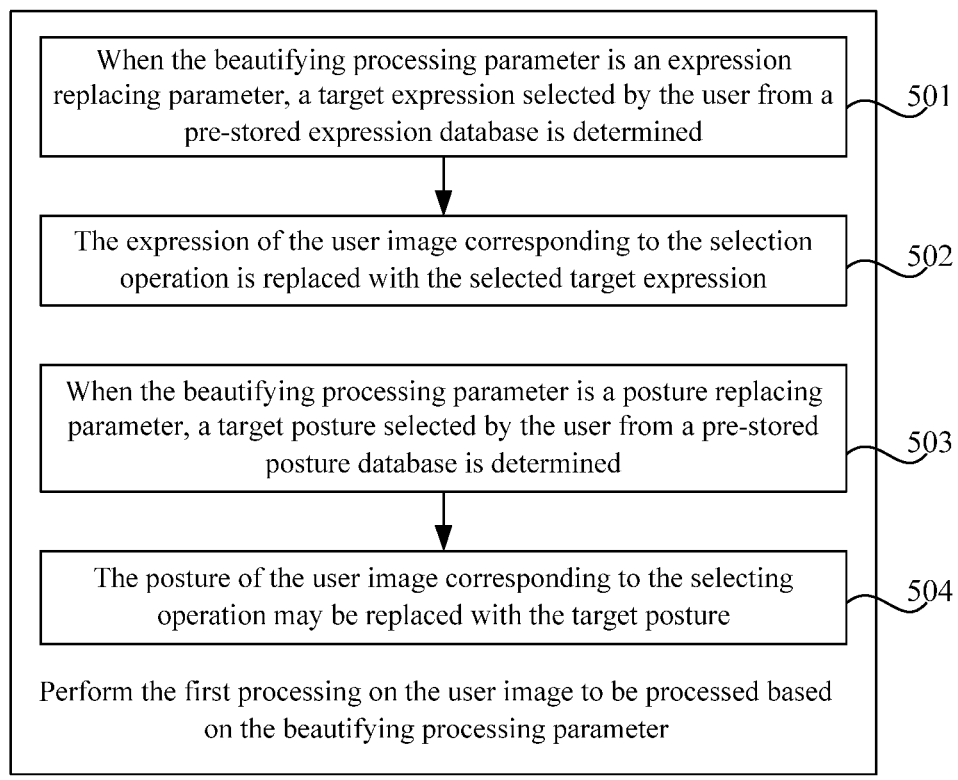
FIG. 5 is a flowchart illustrating a method of processing an image according to yet another example of the present disclosure.

FIG. 5 is a flowchart illustrating a method of processing an image according to another example of the present disclosure. According to the method in the example of the present disclosure, how to perform the first processing on the user image to be processed based on the beautifying processing parameter is described in combination with FIG. 1B. As shown in FIG. 5, the method includes procedures as follows.

At block 501, when the beautifying processing parameter is an expression replacing parameter, a target expression selected by the user from a pre-stored expression database is determined.

In an example, the terminal pre-stores the expression database for different user images to be processed, and the expression database includes different expressions corresponding to users.

In an example, albums on the terminal are classified based on the users, and an album for a designated user is taken as an expression database.

At block 502, the expression of the user image corresponding to the selection operation is replaced with the selected target expression.

In an example of the present disclosure, in blocks 501-502 above, the expression of the user image in the group image is replaced with an expression more satisfactory by selecting the expression in the expression database as the target expression, so as to improve image processing satisfaction for the user.

At block 503, when the beautifying processing parameter is a posture replacing parameter, a target posture selected by the user from a pre-stored posture database is determined.

In an example, albums of the terminal are classified based on the users, and an album for a designated user is taken as the posture database.

In an example, the terminal pre-stores the posture database for different user images to be processed, and the posture database stores different postures corresponding to the users.

At block 504, the posture of the user image corresponding to the selecting operation may be replaced with the target posture.

In an example of the present disclosure, in blocks 503-504 above, the posture of the user image in the group image can be replaced with a posture more satisfactory by selecting the posture in the posture database as the target posture, so as to improve image processing satisfaction for the user.

In an example, the terminal may replace either expression or posture in the user image, or may simultaneously replace both the expression and the posture.

In examples above, when it is detected that the beautifying processing operation is completed, the terminal may store the processed user image and the beautifying processing parameter corresponding to the processed user image into a user parameter database. Thus, when the beautifying processing is subsequently performed on the corresponding user image, the terminal can directly read the beautifying processing parameter corresponding to the user and directly process the user image based on the read beautifying processing parameter, thus, it is not desired to perform parameter re-selection. As a result, the user operation can be simplified, the user time can be saved, and the image processing effect can be improved.

In an example, before processing the user image, the terminal may recognize gender of each user in the group image, and perform second processing on different user images based on respective genders corresponding to the user images. For example, the terminal stores respective parameters for a male user and a female user. When it is determined that the image to be processed is a group image, preliminary processing may be performed on the user images based on the different genders, so as to make subsequent processing for the users convenient and improve image processing effect.

Figure 6:
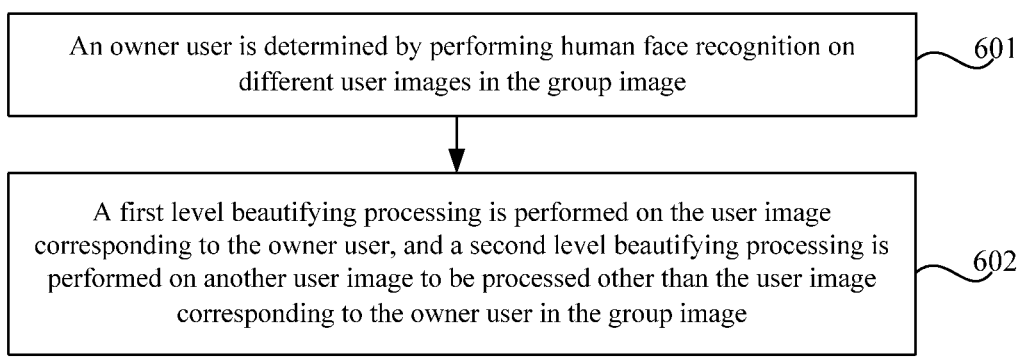
FIG. 6 is a flowchart illustrating a method of processing an image according to yet another example of the present disclosure.

FIG. 6 is a flowchart illustrating a method of processing an image according to another example of the present disclosure. According to the method in the example of the present disclosure, how to performing respective processing on different user images in the group image is described. As shown in FIG. 6, the method includes procedures as follows.

At block 601, an owner user is determined by performing human face recognition on different user images in the group image.

In an example, the terminal pre-stores an image of the owner user. The human face recognition may be performed on different user images in the group image and the recognized user images is respectively compared with the pre-stored owner image to determine whether the owner user is present in the group image, and determine which user image in the group image corresponds to the owner user.

At block 602, a first level beautifying processing is performed on the user image corresponding to the owner user, and a second level beautifying processing is performed on another user image to be processed other than the user image corresponding to the owner user in the group image.

In an example, when recognizing the owner user, the terminal performs different level processing on the respective user images corresponding to the owner user and another user in the group image. For example, the first level beautifying processing is performed on the user image corresponding to the owner user, and the second level beautifying processing is performed on the user image corresponding to another user other than the owner user. The first level may be higher than the second level. For example, a beautifying degree for the user image corresponding to the owner user is higher than that for the user image corresponding to the another user, so as to provide a better beautifying effect on the owner user when the beautifying processing is performed on the image. Thus, the owner user can be highlighted and become a focus in the group image.

In an example of the present disclosure, in blocks 601-602 above, the owner user in the group image can be recognized, and the higher level beautifying processing can be performed on the user image corresponding to the owner user, so as to make the owner user to stand out among the persons in the group image and to meet personalized requirements of the users. In an example, the method above is applicable to different group images, such as a group photo of girlfriends, a group photo of parties, and the like.

Figure 7:
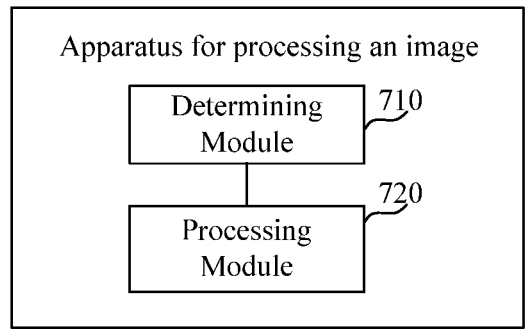
FIG. 7 is a schematic diagram illustrating a structure of an apparatus for processing an image according to an example of the present disclosure.

FIG. 7 is a schematic diagram illustrating an apparatus for processing an image according to an example of the present disclosure. As shown in FIG. 7, the apparatus for processing an image may include a determining module 710 and a processing module 720.

The determining module 710 is configured to determine the number of persons in an image to be processed.

The processing module 720 is configured to perform image processing on a user image to be processed in the image when the number of the persons is greater than or equal to a threshold.

Figure 8:
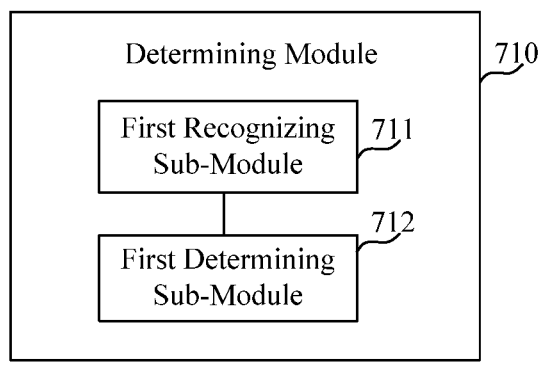
FIG. 8 is a schematic diagram illustrating a structure of an apparatus for processing an image according to another example of the present disclosure.

FIG. 8 is a schematic diagram illustrating an apparatus for processing an image according to another example of the present disclosure. As shown in FIG. 8, the determining module 710 includes a first recognizing sub-module 711 and a first determining sub-module 712 on the basis of the above example illustrated in FIG. 7.

The first recognizing sub-module 711 is configured to determine the number of the persons in the image to be processed.

The first determining sub-module 712 is configured to instruct the processing module 720 to perform a corresponding operation when the number of the persons recognized by the first recognizing sub-module 711 is greater than or equal to the threshold.

Figure 9:
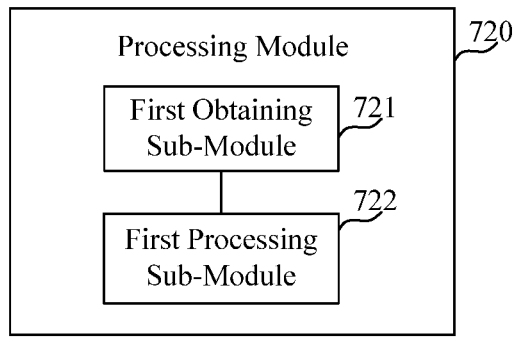
FIG. 9 is a schematic diagram illustrating a structure of an apparatus for processing an image according to still another example of the present disclosure.

FIG. 9 is a schematic diagram illustrating an apparatus for processing an image according to another example of the present disclosure. As shown in FIG. 9, the processing module 720 includes a first obtaining sub-module 721 and a first processing sub-module 722 on the basis of the above example illustrated in FIG. 7.

The first obtaining sub-module 721 is configured to obtain a user image matched with a preset user identity in the image as the user image to be processed, obtain a processing parameter corresponding to the user image to be processed.

The first processing sub-module 722 is configured to perform first processing on the user image to be processed based on the processing parameter.

Figure 10:
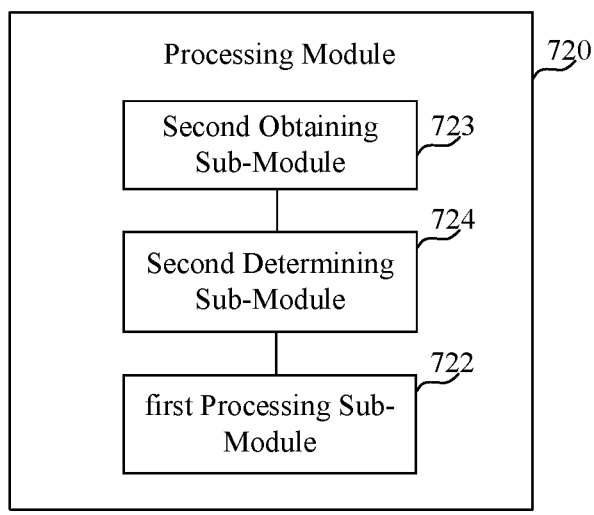
FIG. 10 is a schematic diagram illustrating a structure of an apparatus for processing an image according to yet another example of the present disclosure.

FIG. 10 is a schematic diagram illustrating an apparatus for processing an image according to another example of the present disclosure. As shown in FIG. 10, the processing module 720 includes a second obtaining sub-module 723, a second determining sub-module 724 and a first processing sub-module 722 on the basis of the above example illustrated in FIG. 7.

The second obtaining sub-module 723 is configured to determine a user image selected by a user to be processed in response to a selection operation of the user on user images in the image, and obtain a processing parameter of the selected user image.

The second determining sub-module 724 is configured determine the user image as the user image to be processed.

The first processing sub-module 722 is configured to perform first processing on the user image to be processed based on the processing parameter.

Figure 11:
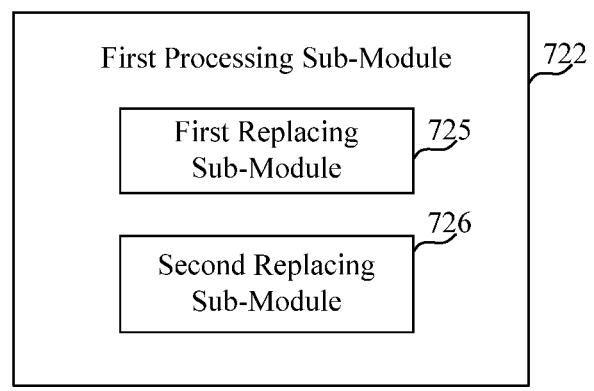
FIG. 11 is a schematic diagram illustrating a structure of an apparatus for processing an image according to yet another example of the present disclosure.

FIG. 11 is a schematic diagram illustrating an apparatus for processing an image according to another example of the present disclosure. As shown in FIG. 11, the first processing sub-module 722 includes a first replacing sub-module 725 and/or a second replacing sub-module 726 on the basis of the above example illustrated in FIG. 9 or 10.

The first replacing sub-module 725 is configured to when the processing parameter comprises an expression replacing parameter, select a corresponding target expression from a pre-stored expression database according to the expression replacing parameter, replace an expression in the user image with the target expression.

The second replacing sub-module 726 is configured to when the processing parameter comprises a posture replacing parameter, select a corresponding target posture from a pre-stored posture database according to the posture replacing parameter, replace a posture in the user image with the target posture.

Figure 12:
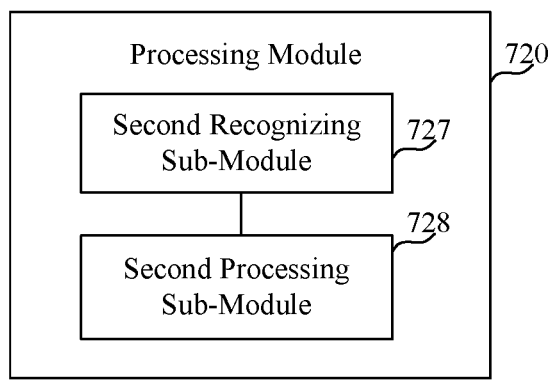
FIG. 12 is a schematic diagram illustrating a structure of an apparatus for processing an image according to yet another example of the present disclosure.

FIG. 12 is a schematic diagram illustrating an apparatus for processing an image according to another example of the present disclosure. As shown in FIG. 12, the processing module 720 includes a second recognizing sub-module 727 and/or a second processing sub-module 728 on the basis of the above example illustrated in FIG. 9 or FIG. 10.

The second recognizing sub-module 727 is configured to recognize a gender of a user in the user image.

The second processing sub-module 728 is configured to perform second processing on the user image based on the gender recognized by the second recognizing sub-module 727.

Figure 13:
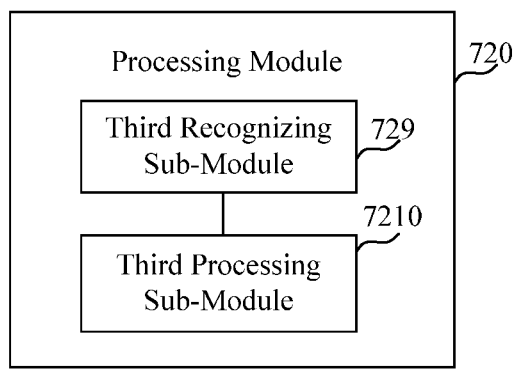
FIG. 13 is a schematic diagram illustrating a structure of an apparatus for processing an image according to another example of the present disclosure.

FIG. 13 is a schematic diagram illustrating an apparatus for processing an image according to another example of the present disclosure. As shown in FIG. 13, the processing module 720 includes a third recognizing sub-module 729 and a third processing sub-module 7210 on the basis of the above example illustrated in FIG. 7.

The third recognizing sub-module 729 is configured to perform human face recognition on user images in the image to determine an owner image corresponding to an owner user.

The third processing sub-module 7210 is configured to perform different image processing on the respective user images corresponding to the owner user and another user image to be processed.

In an example, the image processing comprises beautifying processing.

Figure 14:
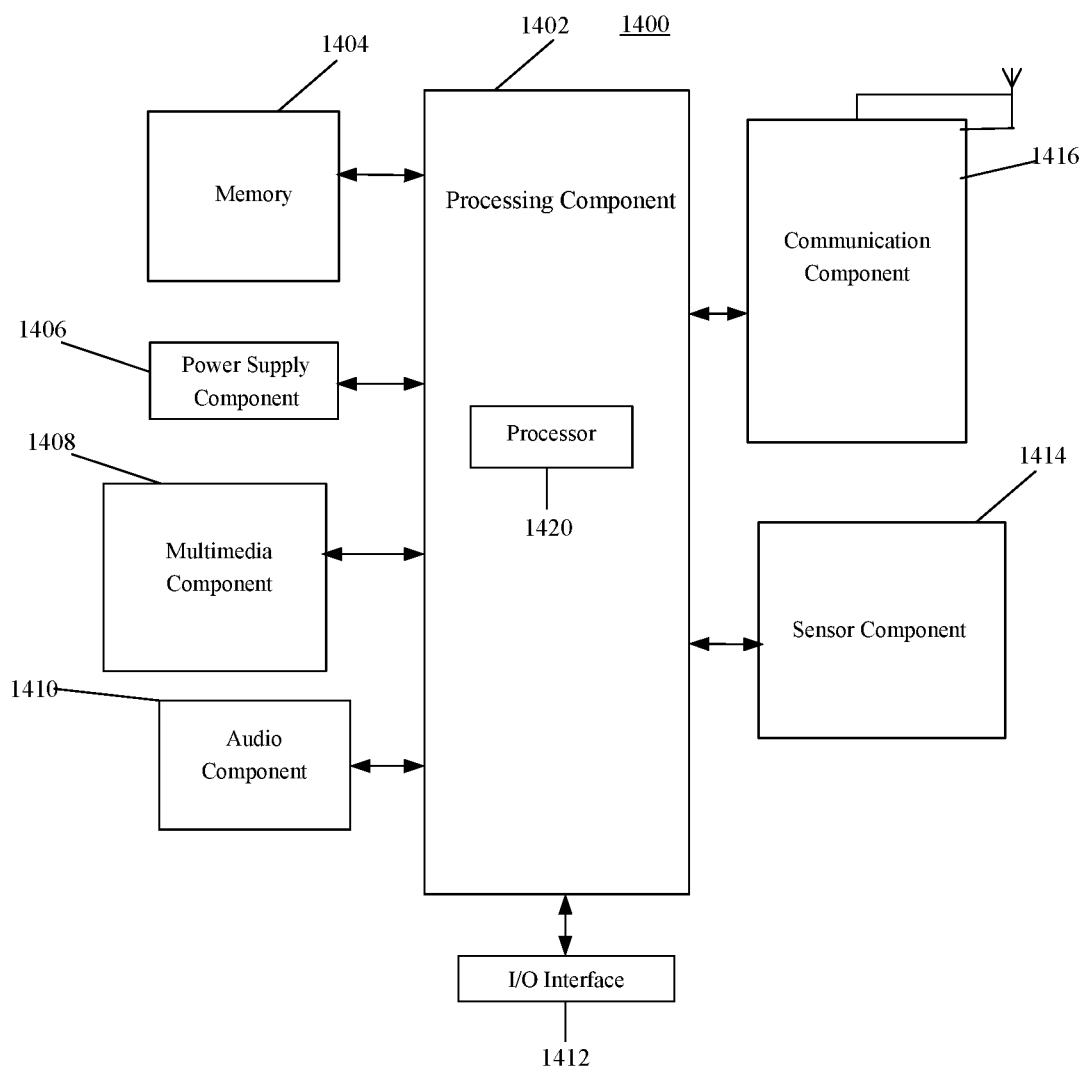
FIG. 14 is a schematic diagram illustrating a hardware structure of an apparatus for processing an image according to an example of the present disclosure.

FIG. 14 is a schematic diagram illustrating a hardware structure of an apparatus for processing an image according to an example of the present disclosure. For example, the apparatus 1400 may be a user equipment, such as a mobile phone, a computer, a digital broadcasting terminal, a message sending and receiving equipment, a game console, a tablet device, a medical equipment, a fitness equipment, a personal digital assistant.

Referring to FIG. 14, the apparatus 1400 may include one or more of the following components: a processing component 1402, a memory 1404, a power supply component 1406, a multimedia component 1408, an audio component 1410, an input/output (I/O) interface 1412, a sensor component 1414, and a communication component 1416. The apparatus 1400 may be a camera device or other electronic device including a camera.

The processing component 1402 generally controls overall operations of the apparatus 1400, such as operations associated with display, phone calls, data communications, camera operations, and recording operations. The processing component 1402 may include one or more processors 1420 to execute instructions to perform all or part of the blocks of the above method. In addition, the processing component 1402 may include one or more modules which facilitate the interaction between the processing component 1402 and other components. For example, the processing component 1402 may include a multimedia module to facilitate the interaction between the multimedia component 1408 and the processing component 1402.

The memory 1404 may be configured to store various types of data to support the operation of the apparatus 1400. Examples of such data include instructions for any application or method operated on the apparatus 1400, contact data, phonebook data, messages, pictures, videos, and so on. The memory 1404 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power supply component 1406 may provide power to different components of the apparatus 1400. The power supply component 1406 may include a power management system, one or more power supplies, and other components associated with generating, managing, and distributing power for the apparatus 1400.

The multimedia component 1408 may include a screen providing an output interface between the apparatus 1400 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, slips, and gestures on the TP. The touch sensors may not only sense a boundary of a touch or slip action, but also sense a duration and a pressure associated with the touch or slip action. In some examples, the multimedia component 1408 may include a front camera and/or a rear camera. The front camera and/or rear camera may receive external multimedia data when the apparatus 1400 is in an operating mode, such as a photographing mode or a video mode. Each of the front camera and the rear camera may be a fixed optical lens system or have focal length and optical zooming capability. The apparatus 1400 may receive a user input on the TP identifying a plurality of persons in a picture frame while taking a group picture of the plurality of persons using the front camera or the rear camera. For example, the user input may tap each person's face in the group picture to at least partially focus the light on each person's face.

The audio component 1410 may be configured to output and/or input an audio signal. For example, the audio component 1410 may include a microphone (MIC) configured to receive an external audio signal when the apparatus 1400 is in an operating mode, such as a call mode, a recording mode, and a voice recognition mode. The received audio signal may be further stored in the memory 1404 or sent via the communication component 1416. In some examples, the audio component 1410 further includes a speaker to output an audio signal.

The I/O interface 1412 may provide an interface between the processing component 1402 and peripheral interface modules. The above peripheral interface modules may include a keyboard, a click wheel, buttons, and so on. These buttons may include, but are not limited to, a home button, a volume button, a starting button, and a locking button.

The sensor component 1414 may include one or more sensors to provide status assessments of various aspects for the apparatus 1400. For example, the sensor component 1414 may detect the on/off status of the apparatus 1400, and relative positioning of component, for example, the component is a display and a keypad of the apparatus 1400. The sensor component 1414 may also detect a change in position of the apparatus 1400 or one component of the apparatus 1400, a presence or absence of the contact between a user and the apparatus 1400, an orientation or an acceleration/deceleration of the apparatus 1400, and a change in temperature of the device apparatus. The sensor component 1414 may include a proximity sensor configured to detect the presence of a nearby object without any physical contact. The sensor component 1414 may further include an optical sensor, such as a CMOS or CCD image sensor which is used in imaging applications. In some examples, the sensor component 1414 may further include an acceleration sensor, a gyroscope sensor, a magnetic sensor, a pressure sensor, or a temperature sensor.

The communication component 1416 may be configured to facilitate wired or wireless communication between the apparatus 1400 and other devices. The apparatus 1400 may access a wireless network that is based on a communication standard, such as Wi-Fi, 2G or 3G, or a combination thereof. In an example, the communication component 1416 receives a broadcast signal or broadcast-associated information from an external broadcast management system via a broadcast channel. In an example, the communication component 1416 further includes a Near Field Communication (NFC) module to facilitate short-range communications. For example, the NFC module may be implemented based on a Radio Frequency Identification (RFID) technology, an Infrared Data Association (IrDA) technology, an Ultra Wideband (UWB) technology, a Bluetooth (BT) technology and other technologies.

In an example, the apparatus 1400 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above method of controlling vibration of a motor.

Vibration information generated by the motor in a vibration process is collected, a first driving parameter outputted by a drive circuit of the motor is determined according to the vibration information and preset reference information corresponding to a type of the motor, wherein the preset reference information records a correspondence between feature parameter of motor working in stable state and driving parameter used by motor working in stable state, and the drive circuit is controlled to drive the motor with the first driving parameter.

In an example, there is also provided a non-transitory machine-readable storage medium including instructions, such as a memory 1404 including instructions. The above instructions may be executed by the processor 1420 of the apparatus 1400 to perform the above method. For example, the non-transitory machine-readable storage medium may be a ROM, a Random Access Memory (RAM), a CD-ROM, a magnetic tape, a floppy disk, and an optical data storage device and so on. The processor 1420 is configured to: determine the number of persons in an image to be processed; and perform image processing on a user image to be processed in the image when the number of the persons is greater than or equal to a threshold.

In examples of the present disclosure, the terminal can perform the image processing (such as beautifying processing) on the user image to be processed in the group image, so as to meet personalized requirements of the user. Since different users cannot have exactly same features about gender, skin color, five sense organs, age, fatness or thinness, etc., different persons may desire different beautifying functions and respective parameters for the beautifying functions. For example, different face thinning degrees are respectively desired for round faces and long faces, and different skin smoothing and whitening degrees are respectively desired for black skins and white skins. When a uniform processing is performed on different user images in the group image by using a uniform processing parameter, processing effect cannot meet requirements of different users. The methods provided in examples of the present disclosure can solve the problem above, and processing effect on the group image is harmonious and natural. Further, when users in the group image have a big age gap with each other, image distortion and image irregularity caused by performing processing with a uniform processing parameter can be avoided.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:

1. A method for processing an image, comprising:
   determining a number of persons in the image to be processed; and
   performing image processing on a user image to be processed in the image when the number of the persons is greater than or equal to a threshold,
   wherein performing the image processing on the user image to be processed in the image comprises:
   performing human face recognition on user images in the image to determine an owner image corresponding to an owner user; and
   performing different image processing on the respective user images corresponding to the owner user and another user image to be processed.

2. The method according to claim 1, wherein performing the image processing on the user image to be processed in the image comprises:
   segmenting the image to a plurality of sub-images respectively corresponding to the number of persons in the image;
   obtaining a user image to be processed by selecting a sub-image that matches a preset user identity in the image;
   obtaining a processing parameter corresponding to the user image to be processed; and
   performing first processing on the user image to be processed based on the processing parameter.

3. The method according to claim 2, wherein performing the first processing in the user image to be processed based on the processing parameter comprises at least one of following acts:
when the processing parameter comprises an expression replacing parameter, selecting a corresponding target expression from a pre-stored expression database according to the expression replacing parameter, replacing an expression in the user image with the target expression; and
when the processing parameter comprises a posture replacing parameter, selecting a corresponding target posture from a pre-stored posture database according to the posture replacing parameter, replacing a posture in the user image with the target posture.

4. The method according to claim 2, further comprising:
recognizing a gender of a user in the user image; and
performing second processing on the user image based on the gender.

5. The method according to claim 1, wherein performing the image processing on the user image to be processed in the image comprises:
determining a user image selected by a user as the user image to be processed in response to a selection operation of the user on user images in the image;
obtaining a processing parameter of the user image to be processed; and
performing first processing on the user image to be processed based on the processing parameter.

6. The method according to claim 5, wherein performing the first processing on the user image to be processed based on the processing parameter comprises at least one of following acts:
when the processing parameter comprises an expression replacing parameter, selecting a corresponding target expression from a pre-stored expression database according to the expression replacing parameter, replacing an expression in the user image with the target expression; and
when the processing parameter comprises a posture replacing parameter, selecting a corresponding target posture from a pre-stored posture database according to the posture replacing parameter, replacing a posture in the user image with the target posture.

7. A terminal, comprising:
a processor, and
a non-transitory machine-readable storage medium storing machine executable instructions which cause the processor to:
determine the number of persons in an image to be processed; and
perform image processing on a user image to be processed in the image when the number of the persons is greater than or equal to a threshold,
wherein the processor is further caused by the machine-executable instructions to:
perform human face recognition on user images in the image to determine an owner image corresponding to an owner user; and
perform different image processing on the respective user images corresponding to the owner user and another user image to be processed.

8. The terminal according to claim 7, wherein the processor is caused by the machine-executable instructions to:
segment the image to a plurality of sub-images respectively corresponding to the number of persons in the image;
obtain a user image to be processed by selecting a sub-image that matches a preset user identity in the image;
obtain a processing parameter corresponding to the user image to be processed; and
perform first processing on the user image to be processed based on the processing parameter.

9. The terminal according to claim 8, wherein the processor is caused by the machine-executable instructions to perform at least one of following acts:
when the processing parameter comprises an expression replacing parameter, selecting a corresponding target expression from a pre-stored expression database according to the expression replacing parameter, replace an expression in the user image with the target expression; and
when the processing parameter comprises a posture replacing parameter, selecting a corresponding target posture from a pre-stored posture database according to the posture replacing parameter, replace a posture in the user image with the target posture.

10. The terminal according to claim 8, wherein the processor is caused by the machine-executable instructions further to:
recognize a gender of a user in the user image; and
perform second processing on the user image based on the gender.

11. The terminal according to claim 7, wherein the processor is caused by the machine-executable instructions to:
determine a user image selected by a user as the user image to be processed in response to a selection operation of the user on user images in the image;
obtain a processing parameter of the user image to be processed; and
perform first processing on the user image to be processed based on the processing parameter.

12. The terminal according to claim 11, wherein the processor is caused by the machine-executable instructions to perform at least one of following acts:
when the processing parameter comprises an expression replacing parameter, selecting a corresponding target expression from a pre-stored expression database according to the expression replacing parameter, replace an expression in the user image with the target expression; and
when the processing parameter comprises a posture replacing parameter, selecting a corresponding target posture from a pre-stored posture database according to the posture replacing parameter, replace a posture in the user image with the target posture.

13. A camera device, comprising:
a touch screen for displaying images and receive user inputs;
a processor in communication with the touch screen; and
a non-transitory machine-readable storage medium storing machine executable instructions which are executable by the processor to:
receive a user input on the touch screen identifying a plurality of persons in a picture frame while taking a group picture of the plurality of persons;
determine a total number of persons in the group picture according to the user input;
segment the group picture to a plurality of sub-images respectively corresponding to each person in the group picture; and perform image processing using prestored settings on respective sub-images in the group picture when the number of persons is greater than or equal to a threshold, wherein the processor is caused by the machine-executable instructions to:

perform human face recognition on the sub-images in the group picture to determine an owner image corresponding to an owner of the camera device; and perform different image processing on the owner image and other sub-images to be processed.

14. The camera device according to claim 13, wherein the processor is caused by the machine-executable instructions to:

perform a first image processing on the owner image corresponding to a first setting for the owner; and perform a second image processing on the other sub-images corresponding to a second setting for persons other than the owner.

15. The camera device according to claim 14, wherein the second image processing comprises no processing for the other sub-images corresponding to other persons in the group picture.

* * * * *